United States Patent
Wu et al.

(10) Patent No.: US 10,585,421 B2
(45) Date of Patent: *Mar. 10, 2020

(54) PROCESS FOR PREPARING AN ADDITIVE TOOLPATH FOR A HYBRID ARTICLE

(71) Applicant: GENERAL ELECTRIC COMPANY, Schenectady, NY (US)

(72) Inventors: Yong Wu, ShangHai (CN); Guoshuang Cai, ShangHai (CN); Kemal Mehmet Coskun, Gebze/Kocaeli (TR); Christopher Edward Thompson, Greenville, SC (US); Robert Trent Hullender, Greenville, SC (US)

(73) Assignee: General Electric Company, Schenectady, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/043,193

(22) Filed: Jul. 24, 2018

(65) Prior Publication Data

US 2019/0072933 A1 Mar. 7, 2019

(30) Foreign Application Priority Data

Sep. 6, 2017 (EP) .................................... 17404003

(51) Int. Cl.
*G06F 19/00* (2018.01)
*G05B 19/4099* (2006.01)
(Continued)

(52) U.S. Cl.
CPC .......... *G05B 19/4099* (2013.01); *B33Y 50/00* (2014.12); *B33Y 50/02* (2014.12);
(Continued)

(58) Field of Classification Search
CPC ...... G05B 19/4099; G05B 2219/32228; G05B 2219/49023; G05B 2219/35134; G05B 2219/49007; B33Y 50/02; B33Y 50/00
See application file for complete search history.

(56) References Cited

U.S. PATENT DOCUMENTS

2007/0225856 A1* 9/2007 Slaughter ........... G05B 19/4099
700/187
2008/0178994 A1* 7/2008 Qi ......................... B22F 3/1055
156/245

(Continued)

OTHER PUBLICATIONS

Kerschbaumer, Michael, Georg Ernst, and Paul O'Leary. "Tool path generation for 3D laser cladding using adaptive slicing technology." International Congress on Applications of Lasers & Electro-Optics. vol. 2005. No. 1. LIA, 2005. (Year: 2005).*

*Primary Examiner* — Michael D Masinick
(74) *Attorney, Agent, or Firm* — Charlotte C. Wilson; James W. Pemrick

(57) ABSTRACT

A process for providing a manufacturing modality for a hybrid article includes defining a model for a build surface on a part in a three dimensional space, and defining a model for an additive structure, the model including an interface surface of the additive structure that corresponds with the build surface in the three dimensional space. The process further includes orienting the x, y and z coordinates of each of the build surface of the part and the interface surface of the model in relation to a three dimensional work space, aligning contours of each of the build surface and the interface surface relative to the work space, and directing a cladding system to define toolpaths for two or more cladding layers that are defined by vertical planar segments or slices of the additive structure model.

19 Claims, 6 Drawing Sheets

(51) Int. Cl.
*B33Y 50/00* (2015.01)
*B33Y 50/02* (2015.01)

(52) U.S. Cl.
CPC .............. *G05B 2219/32228* (2013.01); *G05B 2219/35134* (2013.01); *G05B 2219/49007* (2013.01); *G05B 2219/49023* (2013.01)

(56) References Cited

U.S. PATENT DOCUMENTS

| | | | | |
|---|---|---|---|---|
| 2013/0089642 | A1* | 4/2013 | Lipson | A23P 20/20 |
| | | | | 426/115 |
| 2016/0349729 | A1* | 12/2016 | Fenkl | B23Q 17/2471 |
| 2019/0022760 | A1* | 1/2019 | Coskun | B23K 26/342 |
| 2019/0072933 | A1* | 3/2019 | Wu | G05B 19/4099 |

* cited by examiner

PROCESS FOR PREPARING AN ADDITIVE TOOLPATH FOR A HYBRID ARTICLE

FIELD OF THE INVENTION

The present invention is directed to processes for preparing a toolpath containing laser cladding parameters for manufacturing a hybrid article formed in part by additive manufacturing. More particularly, embodiments of the present invention relate to processes for preparing additive models for hybrid articles that include portions formed by an additive manufacturing cladding process, in some examples, the hybrid articles comprising components of turbine engines.

BACKGROUND OF THE INVENTION

Current component repair processes include capturing the part image by a vision system and creating a two dimensional toolpath for a single layer for laser cladding repair. That single layer cladding is repeated successively in a vertical build direction, following the same toolpath for each successive layer, to deposit a plurality of consecutively stacked layers until the desired height is achieved. Because the toolpath generation is in two dimensions, the build height and geometry is limited to the shape of the very first layer. The resultant modified part typically requires significant post processing to achieve satisfactory component repair. This involves time and resource costs, and material loss. While more complex shapes can be formed, they require the creation of discrete toolpaths for each layer, which also necessitates post formation welding and machining, as well as material loss.

Accordingly, there is a need in the art for methods and processes that enable the formation of complex geometries of supplemental and replacement portions of a part with reduced need for post processing.

BRIEF DESCRIPTION OF THE INVENTION

In one aspect of the invention, a process for preparing a toolpath for manufacturing an additive structure is provided. According to the various embodiments, the process for preparing a toolpath for an additive structure includes the steps of:
(i) providing coordinates, in two or more dimensions, for a build surface, the coordinates defining a build surface contour;
(ii) importing the coordinates of the build surface contour into the working environment of the model, wherein the imported coordinates correspond with coordinates for the interface surface defined by the model;
(iii) selecting a model for the additive structure, the selected model defining the additive structure in at least three dimensions, and including a selected interface surface;
(iv) initially aligning the interface surface of the additive structure model with the build surface contour, wherein each of the interface surface of the additive structure model and the build surface contour has a geometry;
(v) finally aligning the interface surface and the build surface by one of: fitting the build surface contour directly to the interface surface; and, adjusting the geometry of the additive structure interface surface to match the geometry of the build surface contour;
(vi) slicing the additive structure model along a selected axis into a plurality of layers, each layer corresponding with a preselected height, the slices including a first layer corresponding with the interface surface;
(vii) generating a discrete toolpath for each layer of the additive structure model.

In some embodiments, the process is directed by a machine executable CAD program interfaced with a fabricating system comprising a fabrication assembly comprising a cladding machine workspace, a cladding material delivery assembly, at least one laser, an orientation assembly for orienting the interface surface in the workspace relative to the cladding material delivery assembly, and a cladding controller, wherein the process can direct formation of the additive structure anywhere within the fabricating system workspace.

In some embodiments, the fabrication assembly includes an image capturing assembly including a two dimensional camera or two dimensional or three dimensional scanning or imaging device, and an image capturing and processing program.

In some embodiments, the process can generate any one or more of 5 axis, 3+2 axis, 3 axis and 2+1 axis programs for forming the additive structure, and wherein any one or more of the parameters of powder or wire layer deposition, tool path geometry, number of layers, laser parameters, the distance of laser from the build surface, layer thickness, toolpath patterns, toolpath optimization and powder flow, etc.

In some embodiments, the build surface is provided on a surface of a part, and wherein the additive structure model is selected from the group consisting of a model corresponding to an original model for the part and a new model, and wherein the process is employed to provide a hybrid article comprising the additive structure built on the part, wherein step (iv) comprises adjusting the additive structure model, at least at the interface surface, to match the build surface contour.

In some embodiments, the process includes controlling one or more of laser cladding parameters selected from laser power, feedrate, and powder feedrate.

In another aspect of the invention, a process for providing a model for a hybrid article is provided. According to the various embodiments, the process includes defining a model for a build surface on the part in three dimensional space, and defining a model for an additive structure, the model including an interface surface of the additive structure to correspond with the build surface in three dimensional space disposing an additive structure on a surface of the part. The process is executed by a computer program that orients the x, y and z coordinates of each of a build surface of a part and an interface surface of a selected build model in relation to the three dimensional space of a work space. The process includes aligning contours of each of the build surface and the interface surface relative to the work space, and directing a cladding system to define toolpaths for two or more cladding layers, wherein each of the layers is defined by the vertical planar segments or slices of the additive structure model. In some embodiments the aligned contours of the build surface and the interface surface are not the same, and in some such embodiments, at least the contour of the interface surface is adapted to conform to the contour of the build surface. In some further embodiments, one or more sequential toolpaths are adapted to conform in three dimensions with the contour of the build surface. In various embodiments, the cladding system may be one of a CNC system and a robotic device.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
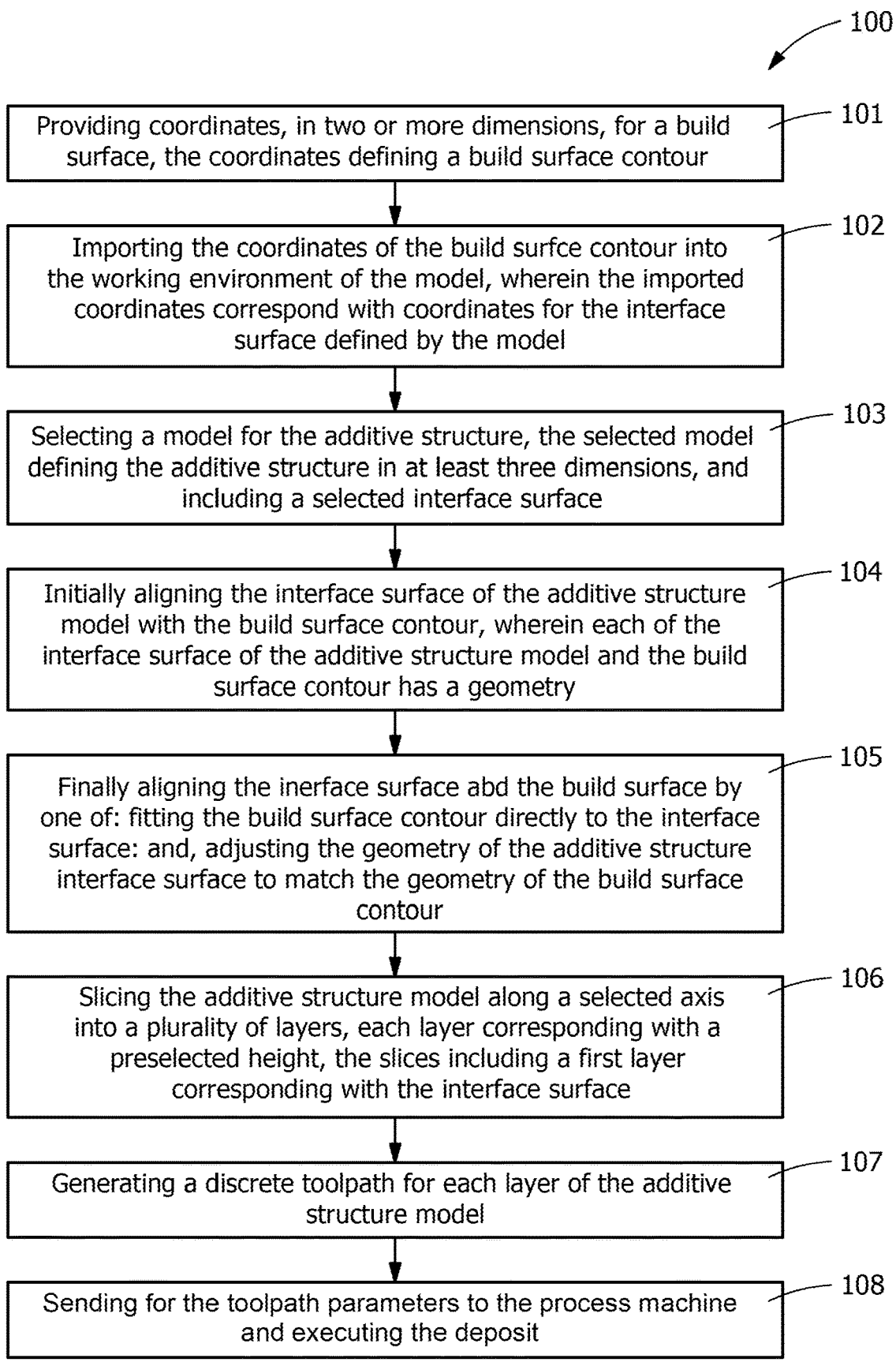
FIG. 1 is a flow chart illustrating one embodiment of a process according to the disclosure.

According to the various exemplified embodiments, provided here are processes for preparing hybrid models for providing a hybrid article using an additive manufacturing (three dimensional) process involving the forming of a plurality of stacked clad layers and directed by a three dimensional additive toolpath generation tool. In some embodiments, the invention includes a process for component repairs, whereby a portion of a damaged part is removed and then replaced by the formation of an additive structure directly on the component according to a preselected model. In some embodiments the model is based on the original part design. In some particular embodiments, the model is based on an updated version of the part design. And in yet other particular embodiments, the model is based on a different component part.

In some embodiments, the invention includes forming a portion of a part onto an existing component wherein the formed portion does not correspond to a removed portion. According to the method, there is no limitation on the geometry or orientation of placement of an additive structure to a component. It will be appreciated that in some embodiments, a hybrid article may be formed by addition of a plurality of additive structures, one or more of which may be either a replacement of a removed portion or an addition of a new portion, or both.

The processes and methods hereof are useful for any of a variety of components. In some examples, the methods are useful for the modification/repair of parts from turbine blades, particularly turbine components selected from a blade, bucket, a nozzle, and a fuel mixer. Of course, it will be appreciated that the methods can be used for repair or modification of any of a variety of manufactured parts not limited to turbine components.

The processes and methods disclosed herein overcome the short comings of two dimensional toolpath generation tools. In various embodiments, the methods provide for the generation of any one or more of 5 axis, 3+2 axis, 3 axis and 2+1 axis programs, thus enabling the creation of complex geometries not limited to conventional two dimensional clad layers. The methods also enable positioning and depositing on to the part the build-up model with high accuracy and repeatability. Advantageously, the methods enable repair of components in a single toolpath generation and cladding operation, thus reducing the resource commitment needed for rework due to manual processes. And, the methods enable the performance of repairs and alterations not previously feasible, including recovery of parts deemed unsalvageable, and the creation of parts with new, hybrid features not present in the original design. Thus, in some examples, legacy parts can be upgraded using three dimensional printing according to the instant methods, enabling enhanced component performance after repair.

Process for Preparing a Toolpath with Laser Cladding Parameters for Manufacturing an Additive Structure According to various embodiments, provided is a process for preparing a toolpath for an additive structure. The process is executable by a computer as complementary to a CAD program to generate 5 axis, 3+2 axis, 3 axis or 2+1 axis CNC programs for additive manufacturing for new make and repair. The process allows the user to set laser cladding parameters and control the geometry of the toolpath. The process further enables the CAD program to import actual part or substrate data that is obtained by a imaging software and enables the user to place the model to be built on the actual part or the substrate.

Conventional processes for toolpath generation allow new part build-up only on plates, providing a build that is located at the absolute coordinate of the program which the user can not alter. The inventive process hereof enables placement of a build model for an additive structure anywhere in the workspace as selected by a user. In some examples the work space is in the context of a CNC system. In other examples, the work space is adapted for use of a robotic system. Thus, the build-up can be placed anywhere in the machine making it easy to fixture. Moreover the process allows the user to match the model to an actual part and perform additive manufacturing for repair in situ on the part.

In accordance with the various embodiments, a program according to the inventive processes (the "toolpath generation tool" or "toolpath generation software") allows the user to direct a build onto a surface of a part to be repaired. In accordance with various embodiments the user can direct the repair according to a pre-selected build model. And in accordance with some embodiments, the user can choose to match the model to the part geometry, or use the computer program according to the inventive processes to morph the three dimensional build of the additive structure to match the geometry of the part. In this manner, a mismatch in the interface contours or overall three dimensional shape of a part and a model is not an obstacle to providing a repair build.

It will be appreciated that with respect to some in service parts, the part may have shrunk or have become distorted or dented such that the overall size and or shape of the contour of the build surface is changed from the part as originally manufactured. As described herein, a layer by layer adaptation of a toolpath enables morphing of an additive structure's model to provide a hybrid article. In morphing the program matches the top surface of the part to the model and builds up the missing section. In both options the algorithm can post out part specific CNC programs or otherwise direct a robotic system with respect to formation of cladding layers. The morphing includes adjusting the x, y and z coordinates for the contour of the model to match the surface of the original part.

For example, in some instances there is a distortion of shape of all or a portion of the part, a deformation of the part adjacent the surface such that the contour of the matching interface surface of the hybrid additive structure does not match the build surface. Accordingly, the interface surface may be adjusted in addition to one or more additional layers so as to render a hybrid build that follows the geometry of the actual part. In some instances there is a near perfect match between the build surface and the interface surface.

Referring now to FIG. 1, a flow diagram provides the general outline for the process for preparing a model for an additive structure according to the instant disclosure. As shown, the process in the flow diagram 100 includes the steps of:

providing coordinates, in two or more dimensions, for a build surface, the coordinates defining a build surface contour 101;

importing the coordinates of the build surface contour into the working environment of the model, wherein the imported coordinates correspond with coordinates for the interface surface defined by the model 102;

selecting a model for the additive structure, the selected model defining the additive structure in at least three dimensions, and including a selected interface surface 103;

initially aligning the interface surface of the additive structure model with the build surface contour, wherein each of the interface surface of the additive structure model and the build surface contour has a geometry 104;

finally aligning the interface surface and the build surface by one of: fitting the build surface contour directly to the interface surface; and, adjusting the geometry of the additive structure interface surface to match the geometry of the build surface contour 105;

slicing the additive structure model along a selected axis into a plurality of layers, each layer corresponding with a preselected height, the slices including a first layer corresponding with the interface surface 106;

generating a discrete toolpath for each layer of the additive structure model and 107;

sending for the toolpath parameters to the process machine and executing the deposit 108

According to the process, the model for the additive structure may be sliced at user defined intervals and planes. The absolute coordinate system can be defined at any location allowing placement of the model in machine workspace. It is possible to define any number of slices to have any selected slicing heights to increase resolution. The process lets the user manipulate toolpaths and their overlap with each other and any interference. Thus, in some examples, the process enables the delivery of cladding layers that include additional feedstock to thereby overlap an adjacent cladding layer. In some embodiments, the user is able to control laser parameters such as standoff feed rate or laser power. The process enables employment of user defined sub-routines to be executed during process for precise part quality and process control. Thus, it is possible to control laser parameters within layers or segments relative to the contour of a layer and its three dimensional height.

The user can thus choose the sub models which can themselves be sliced and each slice may be adapted, including its inner and outer contours, to provide a customized hybrid article, the parameters for which then guide the cladding system selected from a CNC system, and a robotic system. Thus, in some examples wherein the build system is a CNC system, a CNC code is posted out automatically by the program ready for machine ease in building each specific cladding layer according to the system defined toolpath.

In accordance with the various embodiments, the process enables 5 axis toolpath generation, as well as 3+2 and 5 axis build-ups while maintaining the feedrate constant. In some embodiments, the process enables precise control of laser cladding parameters which may be varied for each discrete clad layer. And in the various embodiments, the process enables posting CNC codes for generating 5 axis, 3+2 axis, 3 axis or 2+1 axis, and can slice any geometry with any slicing plane.

Figure 2:
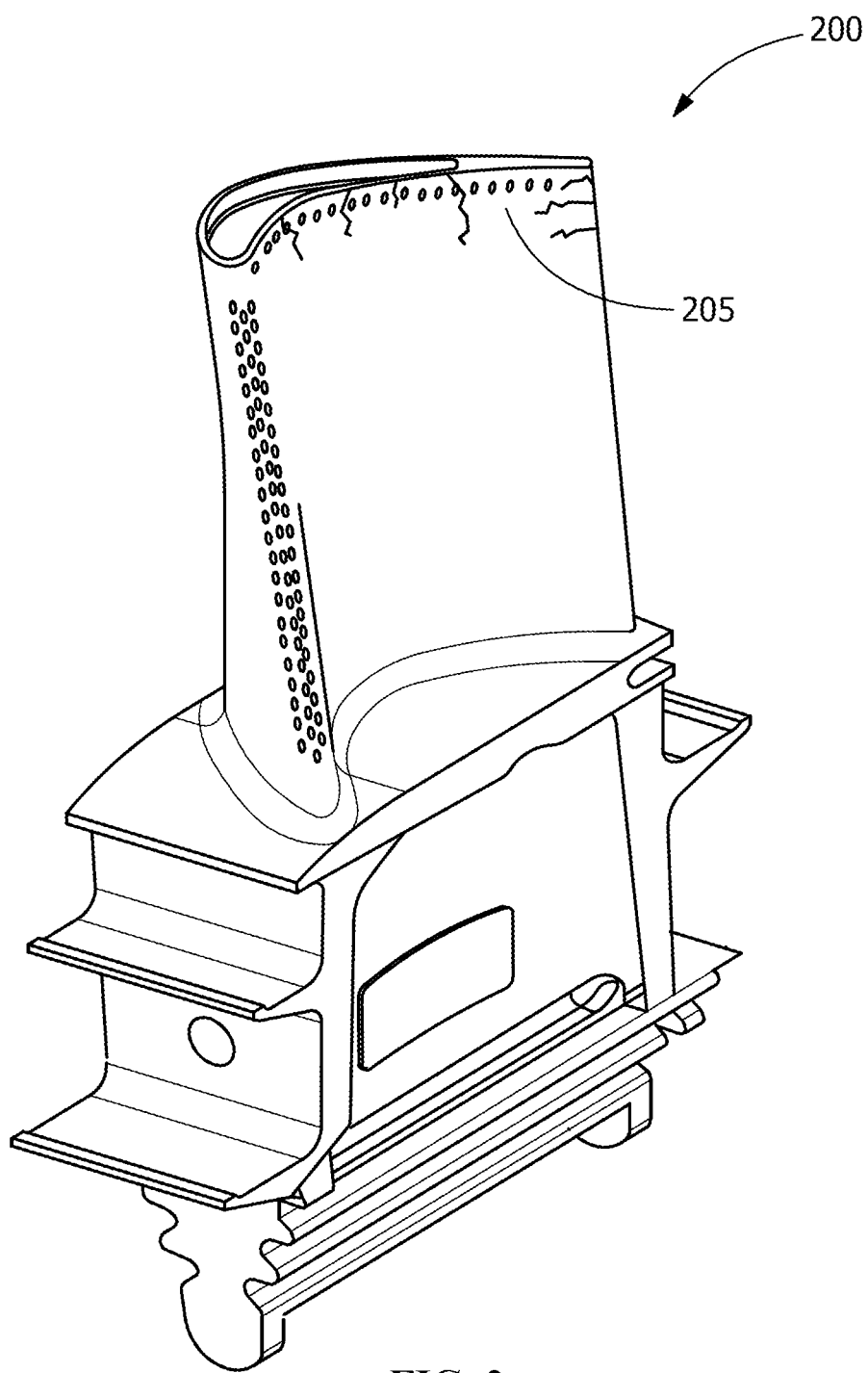
FIG. 2 depicts a representative component for repair according to the disclosed methods.
Figure 3:
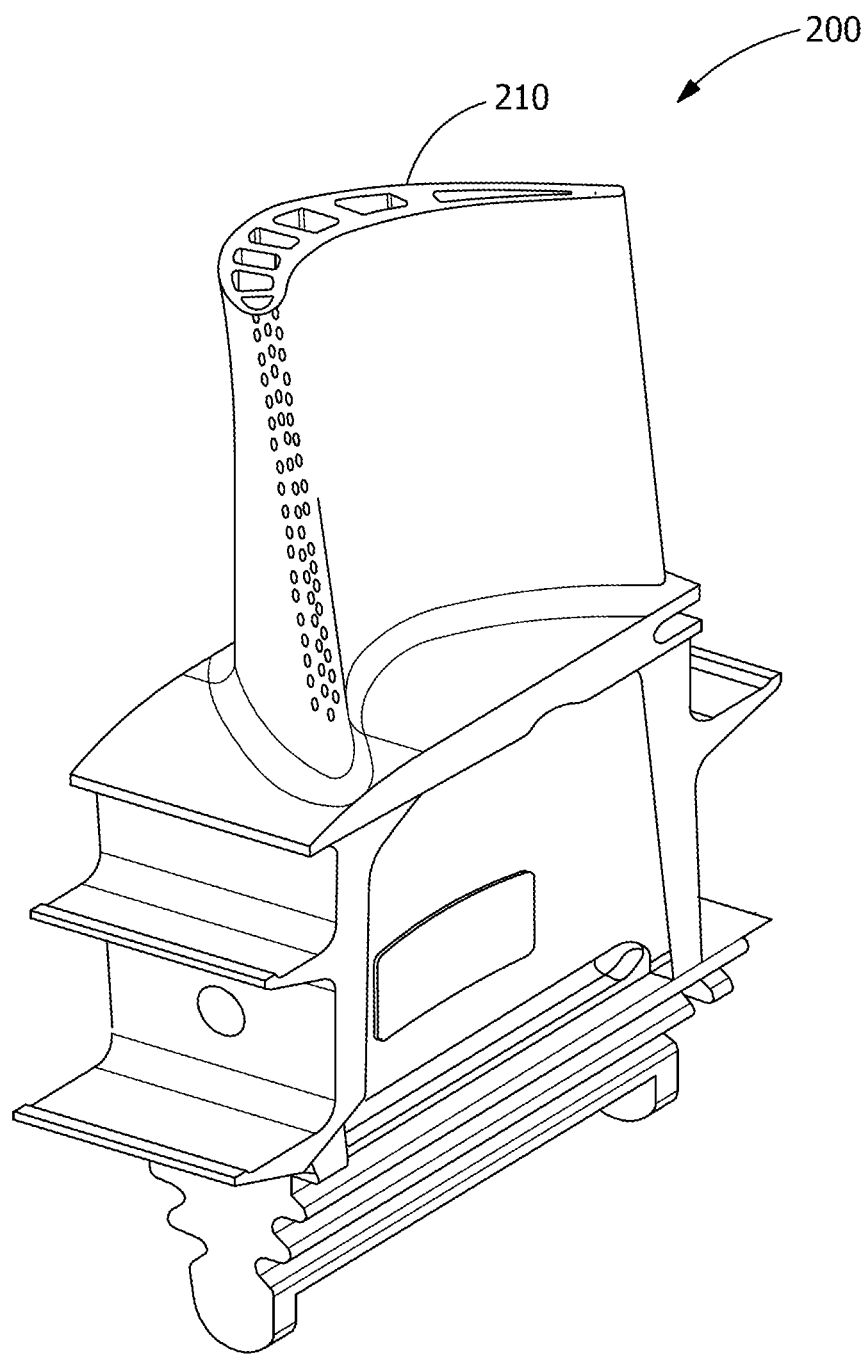
FIG. 3 depicts the component shown in FIG. 2 initially modified by removal of a portion for repair according to the disclosed methods.

Referring now to FIG. 2, an example of a part 200 that can be modified according to the processes of the disclosure is shown, wherein the part is a turbine blade 200 evidencing damage adjacent the tip. According to some embodiments of the invention, the part, such as the blade 200 shown in FIG. 2, may be repaired by replacement of the damaged tip end 205, the replacement being an additive structure 245 that is based on a model 230 selected from the original part model or another model. As shown in FIG. 3, the damaged portion 205 may be removed to provide the build surface 210.

In some embodiments, the part is positioned and oriented in a cladding machine workspace of a fabrication assembly that comprises a cladding material delivery assembly, at least one laser, an orientation assembly for orienting the build surface of the part relative to the cladding material delivery assembly, and a cladding controller.

In some embodiments, the fabrication assembly includes an image capturing assembly including a two dimensional camera or a two dimensional or three dimensional scanning or imaging device, and an image capturing and processing program. In some embodiments, the image capturing program is coupled with the laser cladding machine. In use, each coordinate in three dimensions, x, y and z, of the build surface corresponds to an x, y and z coordinate in the machine workspace. Thus, in repairing a part using a hybrid article model according to the inventive processes, an image of the build surface is captured by the vision system and the three dimensional toolpath generation software places the virtual model of the material to be added on that position. In some specific embodiments, the workspace is defined by a CNC system, wherein the toolpath generation software creates a part specific CNC program with laser parameters for the specific part. In other embodiments, the workspace is adapted for use with a robotic system for depositing the cladding layers.

Figure 4:
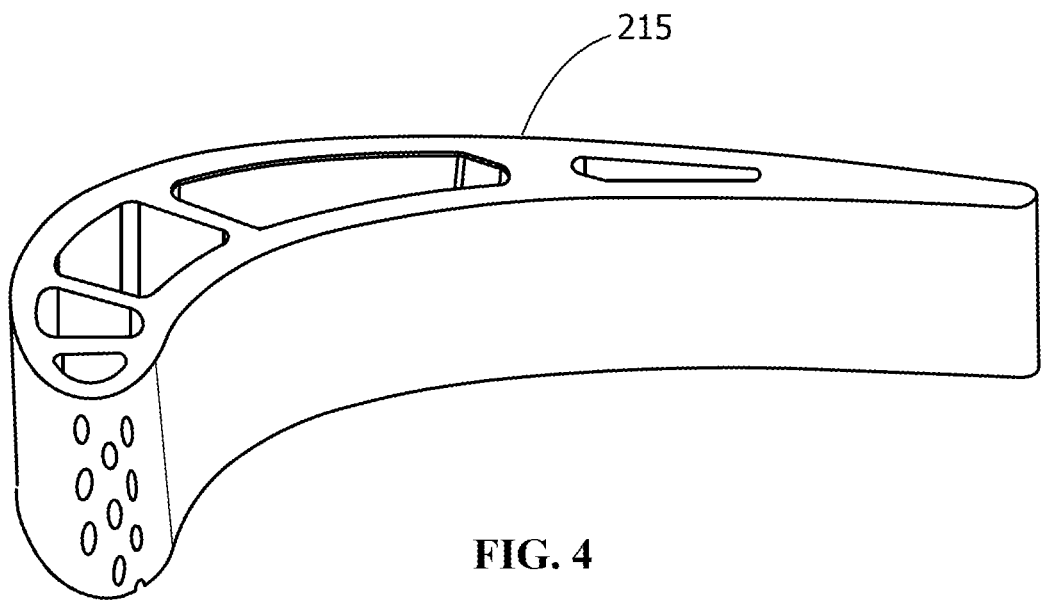
FIG. 4 depicts a model for forming an additive structure according to the disclosed methods.
Figure 5:
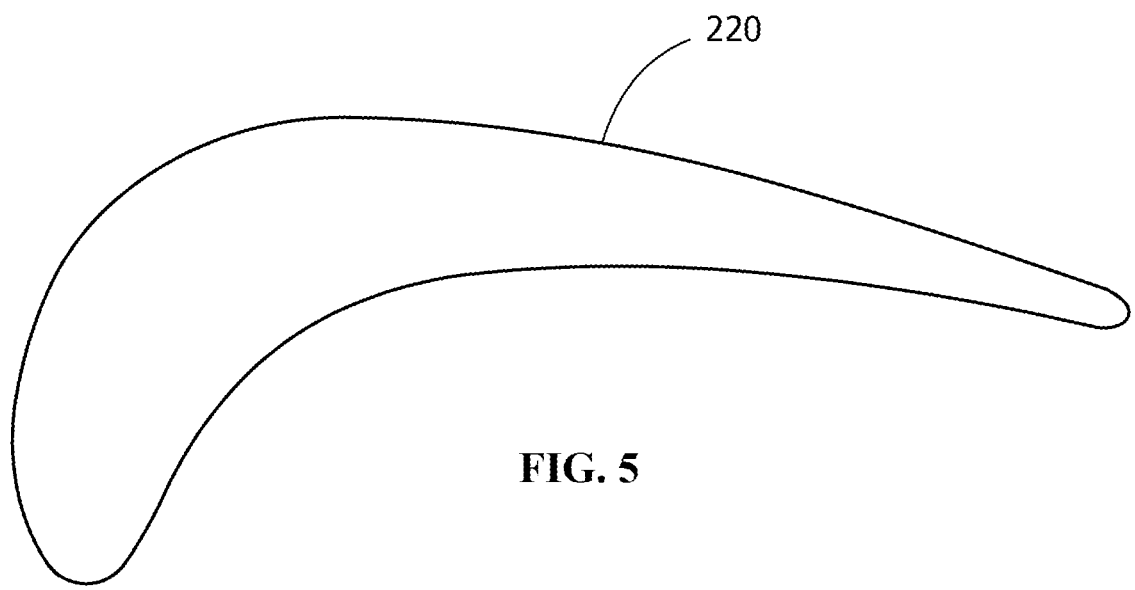
FIG. 5 is a line drawing showing a contour of a build surface shown in FIG. 3.
Figure 6:
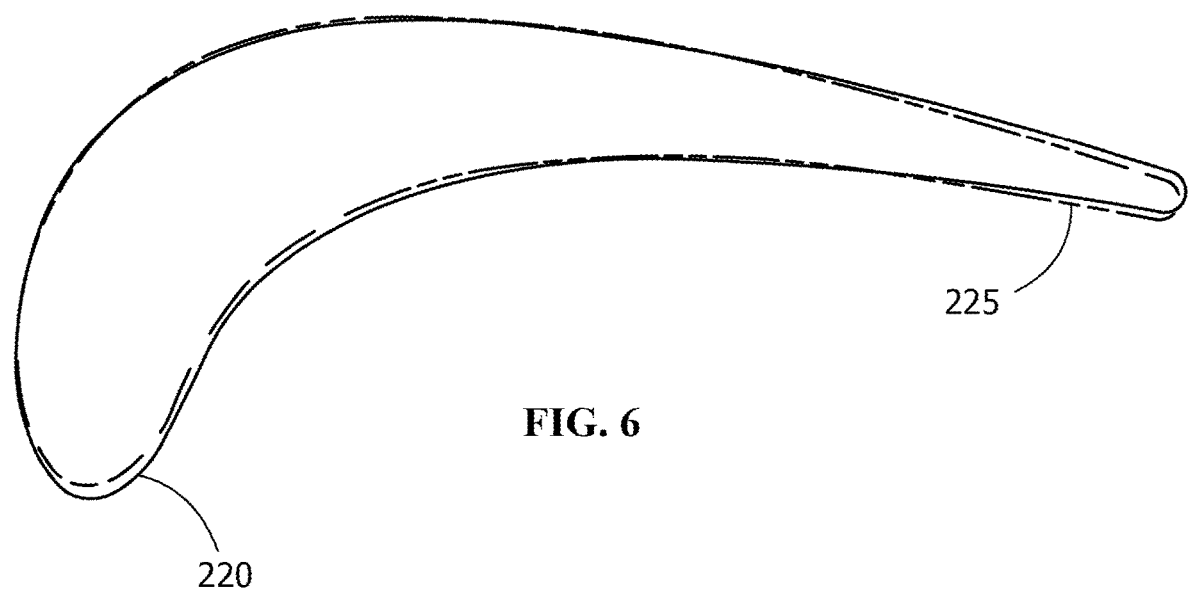
FIG. 6 is a line drawing showing a contour of the build surface shown in FIG. 3 overlaid with a contour of an interface surface of the additive structure shown in FIG. 4.
Figure 7:
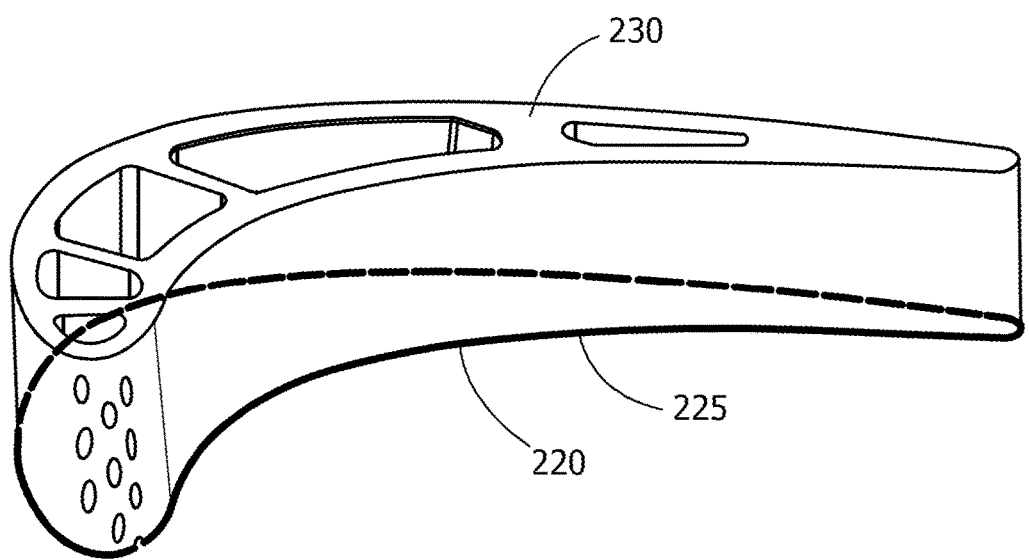
FIG. 7 is a graphic rendering of the computer models for each of the additive structure and the build surfaces showing the two models as overlaid shown in a perspective view.

Referring now to FIG. 4, an isolated portion 215 of a blade 200 is shown, corresponding in the illustration to a rendering of a model 230 for the removed damaged portion 205 of the blade 200 in FIG. 2. In some embodiments according to the inventive processes, selecting the model for the additive structure 230 involves selection from a model that has a part geometry that is the same as a part geometry of the original part, as manufactured or as in service, and a model that has a part geometry that is different from a part geometry of the part. According to the method, the computer model for the additive structure 230, including the additive structure 245 interface surface contour 225, and the imported coordinates for the build surface contour 220 are aligned, as depicted in FIG. 6 and FIG. 7.

Figure 8:
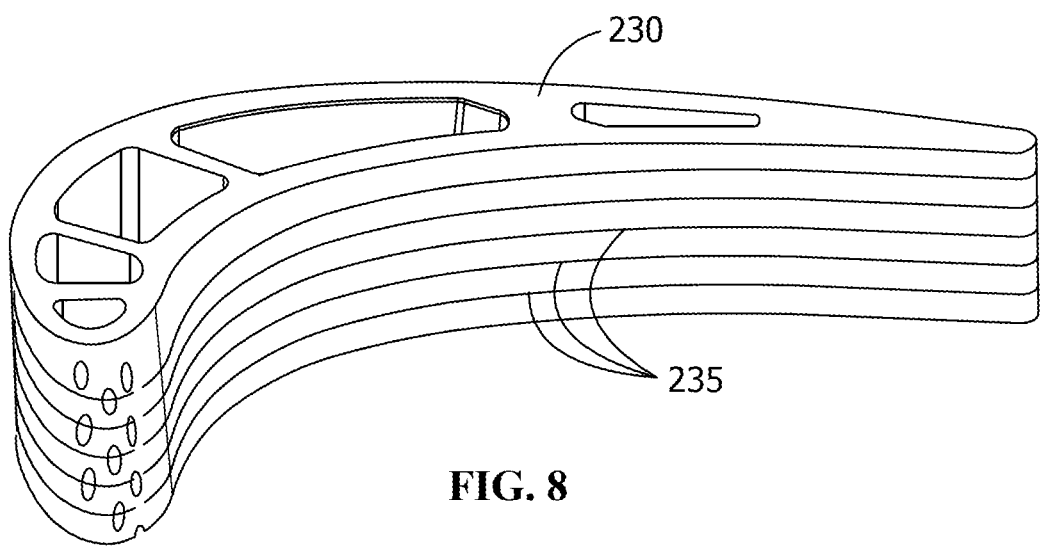
FIG. 8 is an alternate graphic rendering of the computer models for each of the additive structure and the build surfaces as overlaid shown in a perspective view; and, FIG. 9 depicts a representative hybrid article formed by repair of the component depicted in FIG. 3 according to the disclosed methods.
Figure 9:
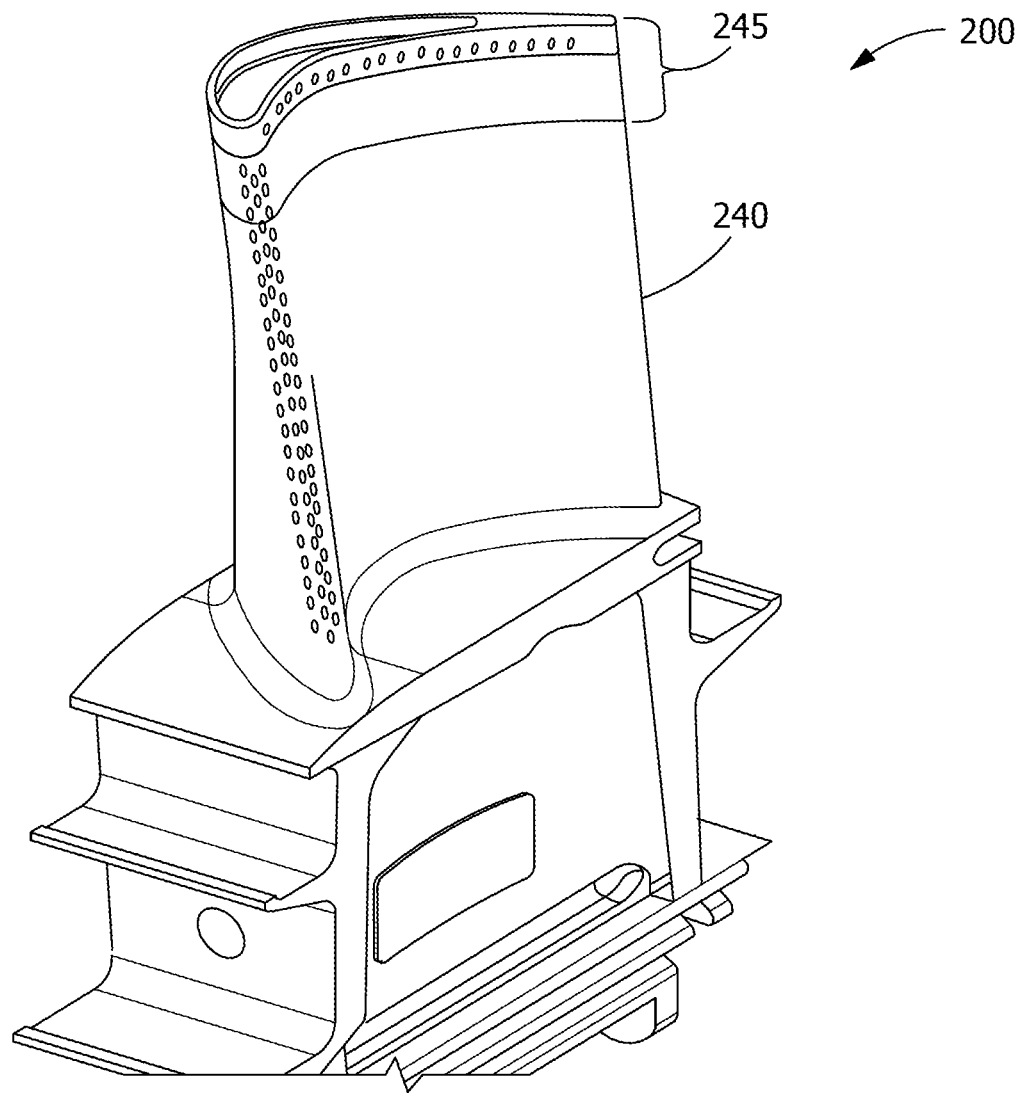

The toolpath generation tool is capable of slicing the virtual model for the additive structure enabling the creation of a unique toolpath for each consecutive layer of a plurality of layers that form the additive structure. Referring now to FIG. 8, the depicted model for the additive structure 230 is shown with selected cut lines 235 that direct discrete toolpath coordinates for the deposit of a clad layer on the part. In accordance with the inventive processes using the toolpath generation tool, each toolpath is formed according to laser cladding parameters corresponding to each layer of the model for the additive structure 230. The resultant hybrid article comprises, in some instances, a repaired part 240, as shown in FIG. 9, wherein the damaged portion has been replaced with the additive structure 245 (compare to FIG. 2 showing damaged portion, 205, and FIG. 4 which shows the isolated removed portion 215).

Used in conjunction with a visioning or laser scanning system, the three dimensional toolpath generation tool is capable of matching the three dimensional virtual model for the additive structure 230 to the actual component 200 and generating part specific CNC codes for use with a CNC system or otherwise direct a robotic or other cladding system. According to some embodiments, the toolpath generation tool can adaptively modify the contour of one or more of the consecutive layers of the additive structure model 230 to match the contour of the build surface 220 of the component 200. In this manner, the resultant hybrid article may be formed with the built up additive structure 245 that follows the geometry of the original component 200.

In some embodiments, the cladding material delivery assembly is adapted to deliver cladding material comprising metal powder or wire. The method may include controlling laser cladding parameters selected from laser power and feedrate. In addition, one or more of the plurality of buildup layers includes extra stock to allow machining.

In some embodiments, the method includes finishing the hybrid article by one or more machining steps selected from the group consisting of manual grinding, adaptive CNC machining, conventional CNC machining, and combinations of these.

In some embodiments, the part is a turbine component. And in some particular embodiments, the part is a turbine component selected from the group consisting of a blade, a shroud, a nozzle, and a fuel mixer.

Laser Cladding

In accordance with the various embodiments, the methods hereof include use of an additive cladding process for formation of each of the plurality of discrete clad layers for forming an additive structure on a build surface of a part. In some examples, the additive methods include one or more of laser cladding with blown powder or wire.

Laser cladding is a well-known technique for applying metal layers on metal substrates. It is used for one or more of repairing metal components, adding structures or features to components, and providing protective surfaces, for example, to increase corrosion and wear resistance of the component. Briefly, a coating of a powdered or wire metal material is applied on a substrate in a particular pattern in two dimensions (i.e., according to a program that defines a two dimensional path), then heating the substrate, in particular by laser radiation (e.g. scanning a laser beam over the substrate). As the metal powder or wire absorbs energy from the laser, the powder melts and solidifies. Successive layers may be added over the initial layer of solidified metal to form a three dimensional build-up wherein each successive layer follows the two dimensional path of the initial layer.

In some particular embodiments, the material for the metal powders or wires may include metal alloys, including nickel and cobalt-based superalloys, stainless and alloy steels, and titanium, aluminum and vanadium alloys, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for preparing a toolpath containing laser cladding parameters for manufacturing an additive structure, comprising:
   (i) providing coordinates, in two or more dimensions, for a build surface, the coordinates defining a build surface contour;
   (ii) importing the coordinates of the build surface contour into the working environment of the model, wherein the imported coordinates correspond with coordinates for the interface surface defined by the model;
   (iii) selecting a model for the additive structure, the selected model defining the additive structure in at least three dimensions, and including a selected interface surface;
   (iv) initially aligning the interface surface of the additive structure model with the build surface contour, wherein each of the interface surface of the additive structure model and the build surface contour has a geometry;
   (v) finally aligning the interface surface and the build surface by one of: fitting the build surface contour directly to the interface surface; and, adjusting the geometry of the additive structure interface surface to match the geometry of the build surface contour;
   (vi) morphing the model so that the model contour fits the part contour;
   (vii) slicing the additive structure model along a selected axis into a plurality of layers, each layer corresponding with a preselected height, the slices including a first layer corresponding with the interface surface;
   (viii) generating a discrete toolpath code for each layer of the additive structure model;
   (ix) transmitting the toolpath code containing the laser cladding parameters for deposition of the layer.

2. The process for preparing a toolpath containing the laser cladding parameters for manufacturing an additive structure according to claim 1, wherein the process is directed by a machine executable CAD program interfaced with a fabricating system.

3. The process for preparing a toolpath containing laser cladding parameters for manufacturing an additive structure according to claim 1, wherein the fabricating system is selected from a CNC system and a robotic system.

4. The process for preparing a toolpath containing laser cladding parameters for manufacturing an additive structure according to claim 1, wherein the CAD program generates one of part specific CNC codes for use with a CNC system or codes that direct a robotic or other cladding system.

5. The process for preparing a toolpath containing laser cladding parameters for manufacturing an additive structure according to claim 2, wherein the fabricating system includes a fabrication assembly comprising a cladding machine workspace, a cladding material delivery assembly, at least one laser, an orientation assembly for orienting the interface surface in the workspace relative to the cladding material delivery assembly, and a cladding controller, wherein the process can direct formation of a new or repair additive structure anywhere within the fabricating system workspace.

6. The process for preparing a toolpath containing laser cladding parameters for manufacturing an additive structure according to claim 5, wherein the fabrication assembly includes an image capturing assembly including a two dimensional camera or two dimensional or three dimensional scanning or imaging device, and an image capturing and processing program.

7. The process for preparing a toolpath containing laser cladding parameters for manufacturing an additive structure according to claim 6, wherein the process can generate any one or more of 5 axis, 3+2 axis, 3 axis and 2+1 axis programs for forming the additive structure, and wherein any one or more of the parameters of powder or wire layer deposition, tool path geometry, number of layers, laser parameters selected from laser power and feedrate, the distance of laser from the build surface, layer thickness, toolpath patterns, toolpath optimization, powder flow rate, laser power, feedrate, beam angle, toolpath overlap and individual layer thickness.

8. The process for preparing a toolpath cladding laser cladding parameters for manufacturing an additive structure according to claim 7, wherein the cladding material delivery assembly is adapted to deliver cladding material on to the build surface of the part, the cladding material comprising one or more of metal powder and wire.

9. The process for preparing a toolpath cladding laser cladding parameters for an additive structure according to claim 7, wherein one or more of the plurality of build layers includes or does not include extra stock to allow machining.

10. The process for preparing a toolpath cladding laser cladding parameters for manufacturing an additive structure according to claim 7, wherein the process includes finishing the hybrid article by one or more machining steps selected from the group consisting of manual grinding, adaptive CNC machining, conventional CNC machining, and combinations of these.

11. The process for preparing a toolpath cladding laser cladding parameters for manufacturing an additive structure according to claim 7, wherein, the part is a turbine component selected from the group consisting of a blade, a shroud, a nozzle, and a fuel mixer.

12. The process for preparing a toolpath cladding laser cladding parameters for manufacturing an additive structure according to claim 7, wherein the build surface is provided on a surface of a part.

13. The process for preparing a toolpath cladding laser cladding parameters for manufacturing an additive structure according to claim 12, wherein the process is employed to provide a hybrid article comprising an additive structure built on the part, the additive structure comprising a plurality of build layers.

14. The process for preparing a toolpath cladding laser cladding parameters for manufacturing an additive structure according to claim 13, wherein the additive structure model is selected from the group consisting of a model corresponding to an original model for the part and a new model.

15. The process for preparing a toolpath cladding laser cladding parameters for manufacturing an additive structure according to claim 14, wherein the model is for a part that is the same or similar to the part comprising the build surface.

16. The process for preparing a toolpath cladding laser cladding parameters for manufacturing an additive structure according to claim 14, wherein the model is for a part that is not the same as the part comprising the build surface.

17. The process for preparing a toolpath cladding laser cladding parameters for manufacturing an additive structure according to claim 1, wherein step (iv) comprises adjusting the additive structure model, at least at the interface surface, to match the build surface contour to thereby provide an adapted model for the additive structure.

18. The process for preparing a toolpath cladding laser cladding parameters for manufacturing an additive structure according to claim 17, wherein more than two layers of the additive structure model are modified to define an additive structure having a three dimensional geometry that is varied from a three dimensional geometry of the selected model.

19. The process for preparing a toolpath cladding laser cladding parameters for manufacturing an additive structure according to claim 18, wherein the adapted model for the additive structure follows a three dimensional geometry of the part.

* * * * *